No. 641,746. Patented Jan. 23, 1900.
J. F. WITTEMANN.
METHOD OF CARBONATING BEER.
(Application filed June 30, 1896.)
(No Model.)
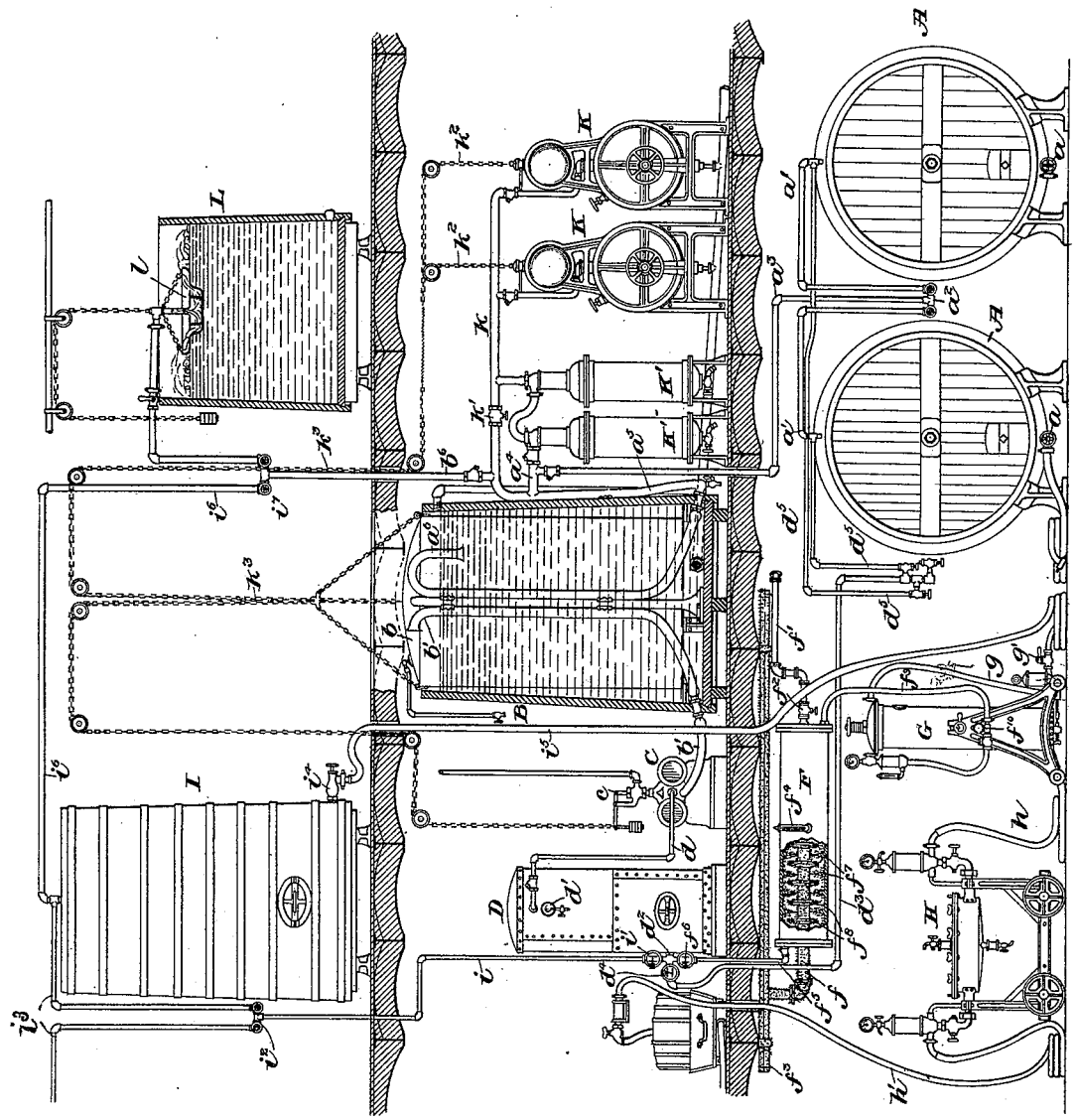
Witnesses
O. W. Smith
Charles E. Riordon
Inventor
Jacob F. Wittemann
By Butterworth & Dowell
his Attorneys

UNITED STATES PATENT OFFICE.

JACOB F. WITTEMANN, OF NEW YORK, N. Y.

METHOD OF CARBONATING BEER.

SPECIFICATION forming part of Letters Patent No. 641,746, dated January 23, 1900.

Application filed June 30, 1896. Serial No. 597,577. (No model.)

*To all whom it may concern:*

Be it known that I, JACOB F. WITTEMANN, a citizen of the United States, residing at New York, (Brooklyn,) in the county of Kings and State of New York, have invented certain new and useful Improvements in Methods of Carbonating Beer; and I do hereby declare the following to be a full, clear, and exact description of the invention, such as will enable others skilled in the art to which it appertains to make and use the same.

This invention relates to methods of carbonating effervescent beverages containing foam-producing elements, but more particularly to methods such as disclosed in my pending application, Serial No. 578,416, filed February 7, 1896, for finishing lager and other beers ready for the market.

In my experience and practice of carbonating beverages I have discovered that in the mechanical means employed to effect a perfect amalgamation of the liquid and carbonic-acid gas the relative temperatures of the liquid and gas have a very important influence on such amalgamation. I am aware that it has been proposed to cool and even refrigerate the liquid previous to its saturation with carbonic-acid gas; but such and other methods heretofore proposed fail to provide a reliable method which accomplishes the perfect amalgamation of the liquid and gas and also a uniform chilling or refrigeration of albuminous beverages, such as beer, so as to cause the coagulation of such albuminoids and other extract matter which it may be desirable to remove from the liquid.

The objects of my invention are to overcome the objectionable features of previous methods by providing a method for effecting a uniform and complete impregnation of the beer or other liquid with carbonic-acid gas and to provide a method for refrigerating the beer or liquid, so as to compensate for its heating through friction due to its passage from the stock-casks to and through intervening conduits and apparatus to the delivery-packages.

The invention consists, essentially, in effecting a thorough and complete amalgamation of the gas and beer by refrigerating the gas to a low temperature sufficiently below the temperature of the beer, so as to condense the gas and cause the same to be more readily absorbed by the liquid and at the same time cause the coagulation of those parts of the albuminous and other matter which it may be desirable to remove from the beer.

In breweries stock-beer, and especially lager-beer, is now ordinarily stored in an atmosphere which is maintained at as nearly as possible to within 1° to 3° Réaumur, while the beer within the stock-casks usually has an actual temperature of about $1\frac{1}{2}°$ to $3\frac{1}{2}°$ Réaumur. I have discovered that very important results are secured by refrigerating the carbonic-acid gas previous to charging the beer therewith and charging the beer while the temperature of the gas is lower than that of the beer. If carbonic-acid gas refrigerated to a temperature at least 1° Réaumur below that of the beer be employed for charging purposes, as complete an amalgamation of the beer and liquid is thereby effected as can be secured in fully-matured naturally-fermented beer stored under a comparatively high bunging pressure—say eight pounds—and at a uniformly low temperature not exceeding 2° Réaumur.

The invention will first be hereinafter more particularly described with reference to the accompanying drawing, forming a part of this specification, and then pointed out in the claims at the end of the description.

It is obvious that any suitable or preferred form of apparatus may be employed for carrying the invention into effect. The drawing represents a diagrammatic view, partly in elevation and partly in section, of one form of apparatus which may be employed.

In this case A may designate one form of "chip" or "bunging" casks, in which the beer may undergo either the main, secondary, or a "kraeusen" fermentation and which may be of any suitable construction, though preferably of the form ordinarily employed in breweries. These casks have racking or outlet connections $a$ in their lower portions and connections $a'$ leading to a valved multiple connection $a^2$, from which a pipe $a^3$ leads to and connects by a pipe $a^4$ to the pipe $a^5$, the latter extending downward and being connected to a pipe $a^6$, which passes through the tank of the gasometer B, so as to conduct the carbonic and other gases into the upper portion of the floating dome $b$ of the gasometer or other gas-collecting vessel which may be provided for that purpose. This gasometer may be of any suitable construction and arranged in any preferred manner. It is preferably provided with an overflow and a suitable waste-pipe (not shown) for the tank and a blow-off or combined safety and suction valve in the upper portion of the floating dome, so as to permit the escape at intervals of the air and nitrogenous or other gases which may collect therein above the carbonic-acid gas. The floating dome $b$ may be suspended in the tank so as to rise and fall and has a pipe $b'$ arranged therein, the upper end of which extends above the level of the liquid and is adapted to convey the carbonic-acid gas therefrom to a suitable gas-pump C, the latter being provided with a valve $c$, having a weighted stem connected to the dome $b$ by a chain or otherwise, so as to close the valve when the dome is lowered in order to stop the pump, so that the medium for impelling the pump may be automatically regulated, so as to maintain the floating dome at a sufficiently high elevation within the gasometer-tank to provide space therein for the separation of the mixed gases that may be fed into the gasometer in substantially the same manner as described in my pending application, filed February 7, 1896, Serial No. 578,416. A connection $d$ is provided between the gas-pump C and the gas-receiver D, so that the carbonic-acid gas contained in the gasometer B may be forced in a compressed state into said receiver when the gas-pump is started, which occurs when there is sufficient gas within the floating dome to cause the same to rise beyond a predetermined point, so as to permit the valve $c$ to open. This receiver may have a pressure-gage $d'$ and a multiple connection $d^2$, provided with a series of pressure-governors, so as to regulate the flow of the gas from the receiver. A pipe $d^3$ connects the governor $d^4$ with the racking-pipes $d^5$, so that gas under suitable pressure may be conveyed into any one of the casks A out of which the beer is to be racked, the valves of the multiple connection $a^2$ being closed during the racking process, so as to prevent the escape of the gas into the gasometer.

For the purpose of effecting a uniform refrigeration of the gas and to convey the same under a suitable pressure to a carbonating apparatus I preferably provide a casing or retort, as F, provided with ammonia or brine circulating pipe or pipes $f$, connected at one end to a pipe $f'$, provided with a regulating-valve $f^2$, and its other end to the general system of circulating-pipes $f^3$. This casing F may have a thermometer $f^4$ and be connected to the multiple connection $d^2$ by a pipe $f^5$, said pipe being provided with a pressure-governor $f^6$ adjacent to said multiple connection, so as to convey the gas under a suitable pressure to the retort, according to the degree of effervescence desired in the beer to be treated and the amount of friction and elevation to be overcome during the racking-off process. The retort may have annular disks or rings $f^7$, secured at intervals to the inner surface thereof or formed integrally therewith and interposed between enlarged flanges or wings $f^8$ of the circulating-pipe $f$, in order to increase the cooling-surface of said pipe and to form an interrupted passage for the gas, so as to thoroughly refrigerate the gas while passing through the retort. A pipe $f^9$, provided with a reducing-valve and pressure-gage $f^{10}$, forms a communication between the retort or casing F and the carbonating apparatus G, the latter being of any suitable form and arranged in any preferred manner, and may have a beer-supply pipe $g$, provided with a suitable valve $g'$, adapted to be connected to either of the casks A for supplying beer to the carbonator. By this means the gas may be refrigerated to substantially the freezing-point of water and at a temperature below that of the beer, so as to cause the coagulation of the albuminous and other extract matter which it is desirable to remove from the beer and to cause a complete amalgamation of the beer and gas. The beer after being charged in the carbonator is preferably forced under a substantially constant head through the pipe $h$ and filter H through the pipe $h'$ to the racking-stand, where the beer or other liquid may be drawn into shipping and other packages ready for the market and in one continuous operation, if desired.

Stock-casks I of any suitable number may be placed at an elevation sufficient to secure the required pressure at the entrance of the beer into the carbonator provided with a racking-pipe $i$, having one end connected to the multiple connection $d^2$ through the pressure-governor $i'$ and its other end connected to a multiple valve connection $i^2$, which latter is provided with pipes $i^3$, connected to the upper portion of said casks, so as to provide means for racking the beer therefrom. The cask or casks are each provided with a racking-off connection $i^4$ at its lower portion provided with a pipe $i^5$, adapted to be connected to the valve $g'$ of the carbonator when the beer is to be taken from this cask, as shown, instead of the chip or bunging casks, and each stock-cask may have a pipe $i^6$, provided with a valve $i^7$ and connected to the pipe $a^5$, so as to convey the carbonic-acid gas during fermentation to the gasometer B.

Should the supply of carbonic-acid gas from the fermenting or stock casks be insufficient for the purpose of carbonating and racking, I prefer to employ one or more gas-generators K. These generators may be of any suitable or preferred form and may have pipes communicating with a pipe $k$, provided with a valve $k'$, so as to communicate directly with the pipe $a^5$, which leads to the gasometer, or the gas may be caused to pass through the gas-purifiers K' and then to the gasometer, as desired. The supply of gas may be controlled by means of the chains $k^2$, which connect at one of their ends to suitable valves in the generator K and their other ends secured to a chain $k^3$, which passes over pulleys and is connected to the floating dome $b$ of the gasometer so as to operate the valves of the generator, in substantially the same manner as disclosed in my aforesaid pending application.

The manner of using the invention will be readily understood from the foregoing description. Assuming the parts to be connected as shown in the drawing and the racking connections closed, it will be seen that the gas rising from the chip and storage casks as well as the gas from the generator K, if desired, will pass into the gasometer, so as to raise the floating dome and operate the pump C. The surplus gas in the gasometer will now be drawn through the pipe $b'$, compressed, and forced by said pump into the gas-receiver D. Should it be desired to rack and charge the beer in one of the casks, as the storage-cask I, for instance, the valve $i^7$ of the pipe $i^6$ is closed and the gas under suitable pressure is conveyed from the receiver D through the pipe $i$ and its connections, at which time the valve of the racking connection $i^4$ thereof may be opened, so as to permit the beer to be forced through the pipe $i^5$ and then through the pipe $g$ into the carbonator, as heretofore explained. Simultaneously with the supply of beer to the carbonator gas from the receiver D is caused to pass through the retort F, where it is refrigerated and condensed and passes through the pipe $f^9$ to the carbonator. The beer may be caused to pass through a column of the refrigerated gas in a subdivided state, so as to be fully saturated and to readily amalgamate with the gas and will collect in the bottom of the carbonator, where, by means of the pipe $h$, it may be conveyed to the filter and from there to the racking-off stand. I thus effect a thorough and complete amalgamation of the gas and beer by refrigerating the gas to a very low temperature and below the temperature of the beer, so as to condense the gas and cause the same to be more readily absorbed by the liquid and at the same time cause the coagulation of the albuminous and other extract matter which it is desirable to remove from the beer.

I have shown an open fermenting vat or tank L, provided with a floating or other gas collector $l$, arranged so as to convey the carbonic-acid gas generated therein to the gasometer; but this latter method and apparatus will form the subject-matter of a separate application and is, therefore, not claimed herein; nor do I claim, broadly, the impregnation of liquids with refrigerated gas or the apparatus herein shown and described, as such method and substantially the same apparatus is disclosed in my pending application, Serial No. 578,416, filed February 7, 1896.

It is of course to be understood that various forms of apparatus may be employed for carrying my invention into effect, and that other beverages than beer may be carbonated by the same method.

In some instances it may be preferable to provide a receptacle in which the carbonic-acid gas is subjected to a preferably high pressure—say about ten atmospheres—and then reduced in temperature by a coil through which a refrigerating medium is forced, or otherwise, so as to make the gas more compact, in order to assist in the refrigerating process, though of course the gas may be reduced in temperature or refrigerated in any other suitable manner.

Having thus fully described my invention, what I claim as new, and desire to secure by Letters Patent of the United States, is—

1. The method of preparing stock-beer and other still liquids for the market, which consists in racking the liquid from its containing vessel under a substantially constant head at a temperature above the freezing-point of water, charging the liquid with carbonic-acid gas at a temperature about the freezing-point of water, so as to effect a complete amalgamation of the liquid and gas, and finally racking the charged liquid into shipping casks or packages under the pressure of said carbonic-acid gas, substantially as described.

2. The method of preparing stock-beer and other still liquids for the market, which consists in racking the liquid from its containing vessel under a substantially constant head at a temperature above the freezing-point of water, and charging the liquid with carbonic-acid gas at a temperature about the freezing-point of water, so as to effect a complete amalgamation of the liquid and gas, substantially as described.

In testimony whereof I affix my signature in presence of two witnesses.

JACOB F. WITTEMANN.

Witnesses:
C. A. NEALE,
J. A. E. CRISWELL.